United States Patent [19]

Aoki et al.

[11] Patent Number: 5,132,580
[45] Date of Patent: Jul. 21, 1992

[54] MOTOR

[75] Inventors: Susumu Aoki, Kiryu; Tsugio Onodera, Azuma, both of Japan

[73] Assignee: Mitsuba Electric Manufacturing Co., Ltd.

[21] Appl. No.: 728,518

[22] Filed: Jul. 11, 1991

[30] Foreign Application Priority Data

Jul. 16, 1990 [JP] Japan ............................ 2-75388[U]

[51] Int. Cl.⁵ .......................................... H02K 13/00
[52] U.S. Cl. ................................... 310/239; 310/90; 310/91; 310/238; 310/248
[58] Field of Search ................... 310/233, 90, 91, 88, 310/238, 239, 219, 241, 242, 245, 247, 248, 249; 384/144, 480

[56] References Cited

U.S. PATENT DOCUMENTS

| 4,384,225 | 5/1983 | Iwaki et al. | 310/88 |
| 4,387,314 | 6/1983 | Iwaki et al. | 310/88 |
| 4,859,894 | 8/1989 | Akutsu et al. | 310/239 |
| 4,926,078 | 5/1990 | Isozumi et al. | 310/239 |

Primary Examiner—R. Skudy
Attorney, Agent, or Firm—McGlew & Tuttle

[57] ABSTRACT

A labyrinth ring having a section of L-shape is radially, inwardly and integrally projected from the inner periphery of a brush holder stay of a motor. This labyrinth ring provides a labyrinth construction in a space portion extending from brushes and a ball and roller bearing in cooperation with the brush holder stay, a commutator, a bearing holder and a distance ring. The thickness of this labyrinth ring is determined to be so thin as to increase the volume of a carbon accumulating space portion formed between the bearing holder and itself as large as possible.

6 Claims, 2 Drawing Sheets

MOTOR

BACKGROUND OF THE INVENTION

1. Field of the Invention

This invention relates to a motor, and more particularly to a motor, in which a bearing of a motor shaft and a brush holder adjoin each other.

2. Description of the Prior Art

In general, in a motor, an armature shaft is rotatably supported on a motor housing using a ball and roller bearing. A commutator and an armature are fixedly mounted on the outer periphery of the armature shaft, adjoining the ball and roller bearing. And further, brushes are arranged to be in sliding contact with the commutator. When electric power is supplied to the armature through the brushes and the commutator, the magnetic lines of force of the armature cross the magnetic fields of field magnets, so that the armature shaft can be rotatably driven.

However, in the motor of the type described, nothing is provided for preventing the abrasion dust of the carbon brushes from scattering in a space portion extending between the bearing and the brushes, whereby such disadvantages are presented that the abrasion dust of the carbon brushes intrudes into the ball and roller bearing to reduce the life of the bearing, or grease sealed in the ball and roller bearing scatters and adheres to a commutating portion, whereby the commutating function is lowered, thus resulting in a shortened life of the motor.

To counter this situation, in some cases, a sealed type ball and roller bearing is used, however, the effect of preventing the intrusion is not satisfactory. Furthermore, in order to prevent the grease of the ball and roller bearing from adhering to the commutating portion, it is known that an oil stopper is fixed to the armature shaft, with which, however, the abrasion dust of the carbon brushes cannot be prevented from intruding into the bearing.

SUMMARY OF THE INVENTION

An object of the present invention is to provide a motor capable of preventing the abrasion dust of the brushes from intruding into a ball and roller bearing.

According to the present invention, a motor, wherein:

a commutator is fixedly mounted on the outer periphery of a shaft, interposing a distance ring between a ball and roller bearing for rotatably supporting the shaft and itself;

a bearing holder fixed to an end bracket is mounted on the outer periphery of the ball and roller bearing:

a brush holder stay surrounding the commutator is connected to this bearing holder; and a brush holder incorporating therein brushes being in sliding contact with the commutator is fixed to the brush holder stay; is characterized in that;

a labyrinth ring is radially and inwardly projected from the inner periphery of the brush holder stay to provide a labyrinth construction in a space portion extending from the brushes and the ball and roller bearing; and the thickness of this labyrinth ring is determined to be so thin that a volume of a space portion for accumulating carbon formed between the bearing holder and the labyrinth ring becomes as large as possible.

In the above-described motor according to the present invention, the labyrinth ring projectedly provided on the inner periphery of the brush holder stay provides a labyrinth construction in the space portion extending from the brushes to the ball and roller bearing, so that the abrasion dust of the brushes can be prevented from intruding into the bearing, without increasing the number of parts.

Further, the thickness of the labyrinth ring of the brush holder stay is determined to increase the volume of the carbon accumulating space portion as large as possible, so that, even if the abrasion dust of the brushes is accumulated, the accumulated abrasion dust can be prevented from scattering again.

Other objects and features of the present invention will become apparent more fully from the following description.

DETAILED DESCRIPTION OF THE PREFERRED EMBODIMENTS

Figure 1:
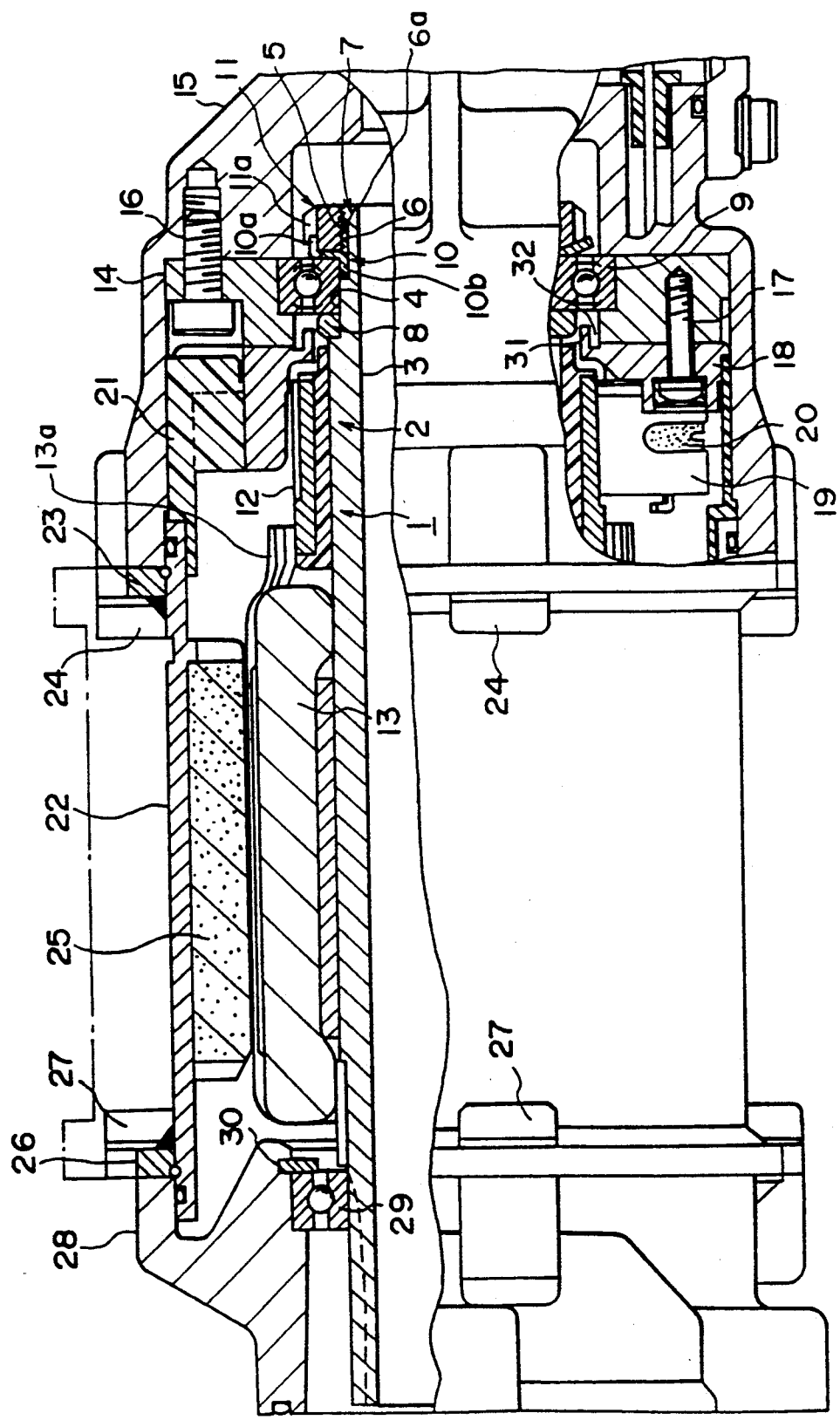
FIG. 1 is a side sectional view showing an embodiment of the motor according to the present invention.

In this embodiment, a hollow shaft 1 as being an armature shaft in a motor has a main body 2 in a cylindrical form. A mounting portion 4 for mounting a ball and roller bearing 9 to be described hereunder, having a small diameter with predetermined width and depth is formed on the outer periphery of an end portion of the main body 2 of the hollow shaft 1, and an externally threaded portion 5 is notchingly formed in an outer portion in the axial direction of the mounting portion 4.

Furthermore, in a portion in the circumferential direction of the mounting portion 4, there is recessedly provided an engageable groove 6 having predetermined width and depth, extending to the vicinity of the forward end of the externally threaded portion 5, for engaging a tongue piece 10b of a washer 10 for a bearing to be described hereunder. Namely, the engageable groove 6 is cuttingly provided extending to the intermediate portion of the externally threaded portion 5, and a remaining wall portion 6a is formed at an outer end portion thereof. Accordingly, at an outer end portion in the axial direction of the externally threaded portion 5 of the main body 2 of the hollow shaft 1, a reinforcing ring portion 7 having predetermined width and thickness is disposed concentrically therewith and integrally projected therefrom.

A sealed type ball and roller bearing 9 is assembled and fixed to the hollow shaft 1 thus constructed, in the following manner. Namely, first, a distance ring 8 is coupled into the mounting portion 4 of the hollow shaft 1 as far as it abuts against a stepped portion of the mounting portion 4. Subsequently, the ball and roller bearing 9 is coupled into the mounting portion 4 as far as it abuts against the distance ring 8.

Next, the washer 10 for the bearing is coupled into the mounting portion 4 as far as it abut against the ball and roller bearing 9. At this time, the tongue piece 10b bent substantially at a right angle to the bearing in the axial direction on the inner periphery of the washer 10 for the bearing is inserted into the engageable groove 6 of the mounting portion 4. The insertion of the tongue piece 10b into the engageable groove 6 locks the washer 10 for the bearing against rotating about the hollow shaft 1.

Subsequently, a nut 11 is threadably coupled to the externally threaded portion 5 of the hollow shaft 1, and the ball and roller bearing 9 coupled to the mounting portion 4 from outside is clamped by the stepped portion of the mounting portion 4 and the nut 11 via the distance ring 8 and the washer 10 for the bearing. When the ball and roller bearing 9 is completely fixed, one of a plurality of engageable pawls 10a arranged at equal intervals in the circumferential direction and radially projecting from the outer periphery of the washer 10 for the bearing is flexed and deformed so as to be inserted into the engageable grooves 11a arranged at intervals in the circumferential direction and recessedly provided inwardly in the radial direction on the outer periphery of the nut 11. The engagement of the engageable pawl 10a with the engageable groove 11a locks the nut 11 against rotating about the hollow shaft 1, via the washer 10 for the bearing, so that the nut 11 can be prevented from being loosened due to the rotation of the hollow shaft 1.

In this embodiment, a commutator 12 and an armature 13 are successively arranged from the side of the mounting portion 4, and fixedly mounted on the outer periphery of the intermediate portion of the hollow shaft 1 as being the armature shaft to be integrally rotatable with the shaft 1. The ball and roller bearing 9 is clamped by the nut 11 by the above-described assembly work to the mounting portion 4 of the hollow shaft 1 to which the commutator 12 and the armature 13 are fixedly mounted. At this time, a bearing holder 14 is previously fixedly mounted on the ball and roller bearing 9, being pressed against the outer periphery of an outer race of the ball and roller bearing 9. Further, a brush holder stay 18 is fixed to the bearing holder 14 through bolts 17. Fixedly mounted on this brush holder stay 18 is a brush holder 19, and brushes 20 held by this brush holder 19 are brought into sliding contact with a commutator 12 fixedly mounted on the hollow shaft 1.

Then, the hollow shaft is inserted into one of end brackets constituting a portion of a motor housing from the side of the bearing holder 14 in a state where the ball and roller bearing 9, the bearing holder 14, the brush device, the commutator 12 and the armature 13 are fixedly mounted to the shaft 1. Subsequently, bolts 16 are inserted through the bearing holder 14, whereby the hollow shaft 1 is assembled to the end bracket 15 in a state of being positioned in place.

Next, a resinous cover 21 is coupled onto the outer periphery of the brush holder stay 18 so that the resinous cover 21 surrounds the exteriors of the brush holder stay 18 and the brush holder 19.

In this embodiment, a labyrinth ring 31 for providing a labyrinth construction is integrally projected from the inner periphery of the brush holder stay 18 at a neighborhood of an inner end thereof. Namely, the labyrinth ring 31 is formed in a ring form having a section of L-shape, and disposed concentrically with the brush holder stay 18 and projected inwardly in the radial direction in such a manner that the forward end of a tubular opening thereof is substantially opposed to the central portion of the ball and roller bearing 9 and positioned between the bearing holder 14 and the distance ring 8.

Accordingly, on the side of the labyrinth ring 31 opposed to the ball and roller bearing 9, a carbon accumulating space portion 32 is formed in an annular shape along the inner periphery of the bearing holder 14 between the labyrinth ring 31 and the inner periphery of the bearing holder 14, and the thickness of the labyrinth ring 31 is determined to be so thin as to increase the volume of the space portion 32 as large as possible.

Furthermore, a yoke 22 constituting a portion of the motor housing covers the end bracket 15 in a state of being coupled onto the hollow shaft 1. The yoke 22 is clamped to the end bracket 15 by the bolts 24 at a flange portion 23 welded to the outer periphery at one end of the yoke 22. Fixedly mounted and arranged in the circumferential direction on the inner periphery of the yoke 22 are magnets 25 which are opposed to the armature 13 fixedly mounted on the hollow shaft 1.

Then, a second end bracket 28 covers an opening portion at the other end of the yoke 22. Another flange portion 26 welded to the outer periphery of the yoke 22 is clamped to the end bracket 28 by the bolts 27, whereby this end bracket 28 and the yoke 22 are connected to each other. A ball and roller bearing 29 is coupled to into this second end bracket 28 and held by a stopper ring 30 in a state of being positioned in place. And an end portion of the hollow shaft 1 is coupled into an inner race of the ball and roller bearing 29. With this arrangement, the hollow shaft 1 is rotatably supported by the ball and roller bearings 9 and 29 which are disposed in the both end brackets 15 and 28, respectively.

Operation of this embodiment will hereunder be described.

In the motor thus assembled and constructed, when electric power is supplied to the armature 13 through the brushes 20 and the commutator 12, armature 13 is provided with windings 13a connected to the commutator 12, the magnetic lines of force of the armature 13 cross the magnetic fields of the magnets 25, whereby the hollow shaft 1 is rotatably driven.

Then, during this rotatable driving, the sliding of the brushes against the commutator 12 causes the abrasion dust of the brushes to scatter, and grease sealed in the ball and roller bearing melts and scatters.

However, in this embodiment, the labyrinth ring 31 in the ring form having the section of L-shape is radially and inwardly projected from the inner periphery of the brush holder stay 18, whereby the space portion extending between the brushes 20 and the ball and roller bearing 9 is formed to be a labyrinth construction constituted by the brush holder stay 18, the commutator 12, the bearing holder 14 and the distance ring 8, so that, when the hollow shaft 1 is rotatably driven, even if the abrasion dust of the brushes scatters, the abrasion dust is hindered from going toward the bearing 9.

Further, the thickness of the labyrinth ring 31 is determined to be so thin as to increase the volume of the carbon accumulating space portion 32 formed between the bearing holder and the labyrinth ring 31 as large as possible, so that, when the abrasion dust of carbon scatters, the abrasion dust is gathered and accumulated in the space portion 32 and the accumulated abrasion dust can be prevented from scattering again.

Figure 2:
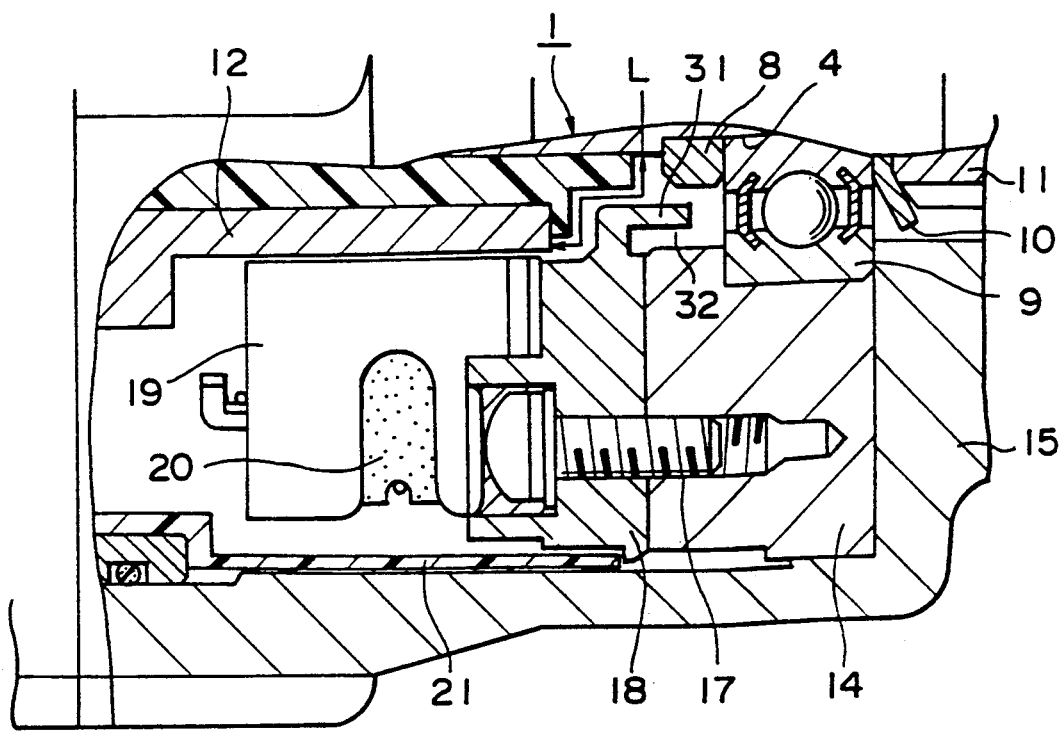
FIG. 2 is an enlarged partial sectional view of the motor.

As shown in FIG. 2, in the above embodiment, a creeping distance L from the outer peripheral surface of the hollow shaft 1 to the segment of the commutator 12 is made long, so that, even if the abrasion dust of carbon adheres, occurence of deteriorated insulation can be suppressed.

Incidentally, the present invention should not be limited to the above embodiment, and various changes and modifications can be adopted within the scope of the invention.

As has been described hereinabove, according to the present invention, the labyrinth ring projected from the brush holder stay provides the labyrinth construction in the space portion extending from the brushes to the bearing in cooperation with the brush holder stay, the commutator and the distance ring, and the thickness of the labyrinth ring of the brush stay is determined to be so thin as to increase the volume of the carbon accumulation space portion as large as possible, so that the abrasion dust of carbon can be prevented from intruding into the ball and roller bearing, thereby improving the durability of the motor.

What is claimed is:

1. A motor comprising:
   a commutator is fixedly mounted on an outer periphery of a shaft, interposing a distance ring between the commutator and a ball and roller bearing for rotatably supporting the shaft;
   a bearing holder fixed to an end bracket is mounted on an outer periphery of the ball and roller bearing;
   a brush holder stay surrounding the commutator is connected to said bearing holder; and
   a brush holder incorporating therein a brush being in sliding contact with the commutator is fixed to the brush holder stay;
   a labyrinth ring projected radially and inwardly from an inner peripheral portion of the brush holder stay provides a labyrinth construction in a space portion extending from the brush to said ball and roller bearing; and
   a thickness of said labyrinth ring is determined to be so thin as to increase volume of a carbon accumulating space portion formed between the bearing holder and the labyrinth ring itself as large as possible.

2. The motor as set forth in claim 1, wherein:
   said labyrinth ring provides a labyrinth construction in a space portion extending the brush and the ball and roller bearing in cooperation with the brush holder stay, the commutator, the bearing holder and the distance ring.

3. The motor as set forth in claim 1, wherein:
   said labyrinth ring is in a ring form having a section of L-shape, and disposed concentrically with the brush holder stay and projected radially and inwardly from the inner peripheral portion of the brush holder stay, in such a manner that a forward end of a tubular opening thereof is substantially opposed to a central portion of the ball and roller bearing and is positioned between the bearing holder and the distance ring.

4. The motor as set forth in claim 1, wherein:
   said labyrinth ring is integrally formed on said brush holder stay.

5. The motor as set forth in claim 1, wherein:
   said carbon accumulating space portion is formed on the side of the labyrinth ring opposed to the ball and roller bearing in an annular form between an inner peripheral surface of the bearing holder and the labyrinth ring.

6. The motor as set forth in claim 1, wherein:
   said labyrinth ring is integrally and radially projected from the inner peripheral portion of the brush holder stay at a adjacent an inner end thereof, and said labyrinth ring further axially and inwardly projected from radially projected end thereof toward the ball and roller bearing.

* * * * *